United States Patent
Fields, Jr. et al.

(10) Patent No.: US 6,970,936 B2
(45) Date of Patent: Nov. 29, 2005

(54) DATA PROCESSING SYSTEM AND METHOD OF COMMUNICATION THAT EMPLOY A REQUEST-AND-FORGET PROTOCOL

(75) Inventors: James Stephen Fields, Jr., Austin, TX (US); Sanjeev Ghai, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 857 days.

(21) Appl. No.: 09/740,220

(22) Filed: Dec. 19, 2000

(65) Prior Publication Data
US 2002/0078252 A1   Jun. 20, 2002

(51) Int. Cl.[7] .............................................. G06F 15/16
(52) U.S. Cl. ...................... 709/230; 709/203; 709/207; 709/213; 709/219; 709/232
(58) Field of Search .................... 709/201, 212, 709/214, 216, 203, 207, 213, 219, 230, 232; 711/140, 146, 148

(56) References Cited

U.S. PATENT DOCUMENTS

| | | | | |
|---|---|---|---|---|
| 5,210,860 A | * | 5/1993 | Pfeffer et al. | 714/42 |
| 5,506,971 A | * | 4/1996 | Gullette et al. | 710/116 |
| 5,822,765 A | * | 10/1998 | Boatright et al. | 711/146 |
| 6,018,792 A | * | 1/2000 | Jeddeloh et al. | 711/146 |
| 6,073,212 A | * | 6/2000 | Hayes et al. | 711/122 |
| 6,108,735 A | * | 8/2000 | Pawlowski | 710/107 |
| 6,272,600 B1 | * | 8/2001 | Talbot et al. | 711/140 |
| 6,418,514 B1 | * | 7/2002 | Arimilli et al. | 711/133 |
| 6,487,643 B1 | * | 11/2002 | Khare et al. | 711/150 |

* cited by examiner

*Primary Examiner*—Nabil El-Hady
(74) *Attorney, Agent, or Firm*—Casimer K. Salys; Dillon & Yudell LLP (57) ABSTRACT

A data processing system includes a requester having a request queue and a recipient. The requester, which buffers a request in an entry of the request queue, transmits the request to the recipient for servicing. According to the request-and-forget protocol, the requester removes the request from the entry of the request queue without receipt of any indication that the request has been serviced.

18 Claims, 7 Drawing Sheets

DATA PROCESSING SYSTEM AND METHOD OF COMMUNICATION THAT EMPLOY A REQUEST-AND-FORGET PROTOCOL

BACKGROUND OF THE INVENTION

1. Technical Field

The present invention relates in general to data processing and, in particular, to communication in a data processing system. Still more particularly, the present invention relates to a data processing system and method of communication utilizing a "request-and-forget" protocol.

2. Description of the Related Art

At a conceptual level, a data processing system can be thought of as a collection of interconnected components, each comprising hardware and/or software and/or firmware, which operate in concert to process information. Because each component of the data processing system has a limited range of functionality circumscribed by its circuitry and/or programming as well as a finite amount of data storage, components must frequently make requests for service by other components of the data processing system in order to accomplish the necessary work.

Data processing systems nearly universally manage such requests by implementing queues to buffer requests at each of the requester component (also referred to as master or client) and the recipient component (also referred to as slave or server). In a typical management scheme, the requester allocates a queue entry to a request and maintains the queue entry allocation until the requester receives an acknowledgment of service (and perhaps data associated with the request) from the recipient. The requester removes the request from the queue only after receiving the acknowledgment, meaning that the allocated queue entry cannot be utilized for processing another request until the current request has been retired. Consequently, the maximum number of requests undergoing processing at any one time is equal to the queue depth of the requester.

To avoid the requester overflowing the queues of the recipient, it is often required for the requester to have intimate knowledge of the queue capacity of the recipient, the latencies associated with the transmission of requests and acknowledgments between the requester and the recipient, the number of types of possible requests and acknowledgments, and so forth. The requirement that the requester have knowledge of the internal design of the recipient, the communication latency, the possible information types, etc., limits the flexibility of system design and may require the incorporation of a large number of configuration fields or the like into the design of the requester to indicate the recipient's configuration. With such limitations and complexity present in each requestor/recipient pair, data processing system design tends to be either undesirably inflexible or complex or both.

The present invention offers an attractive alternative request-servicing protocol that permits more flexibility in data processing system design while allowing the data processing system to support more requests undergoing processing than there are queue entries in the requester.

SUMMARY OF THE INVENTION

A data processing system in accordance with the present invention includes a requester having a request queue and a recipient. The requester, which buffers a request in an entry of the request queue, transmits the request to the recipient for servicing. According to the request-and-forget protocol, the requester removes the request from the entry of the request queue without receipt of any indication that the request has been serviced.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1A:
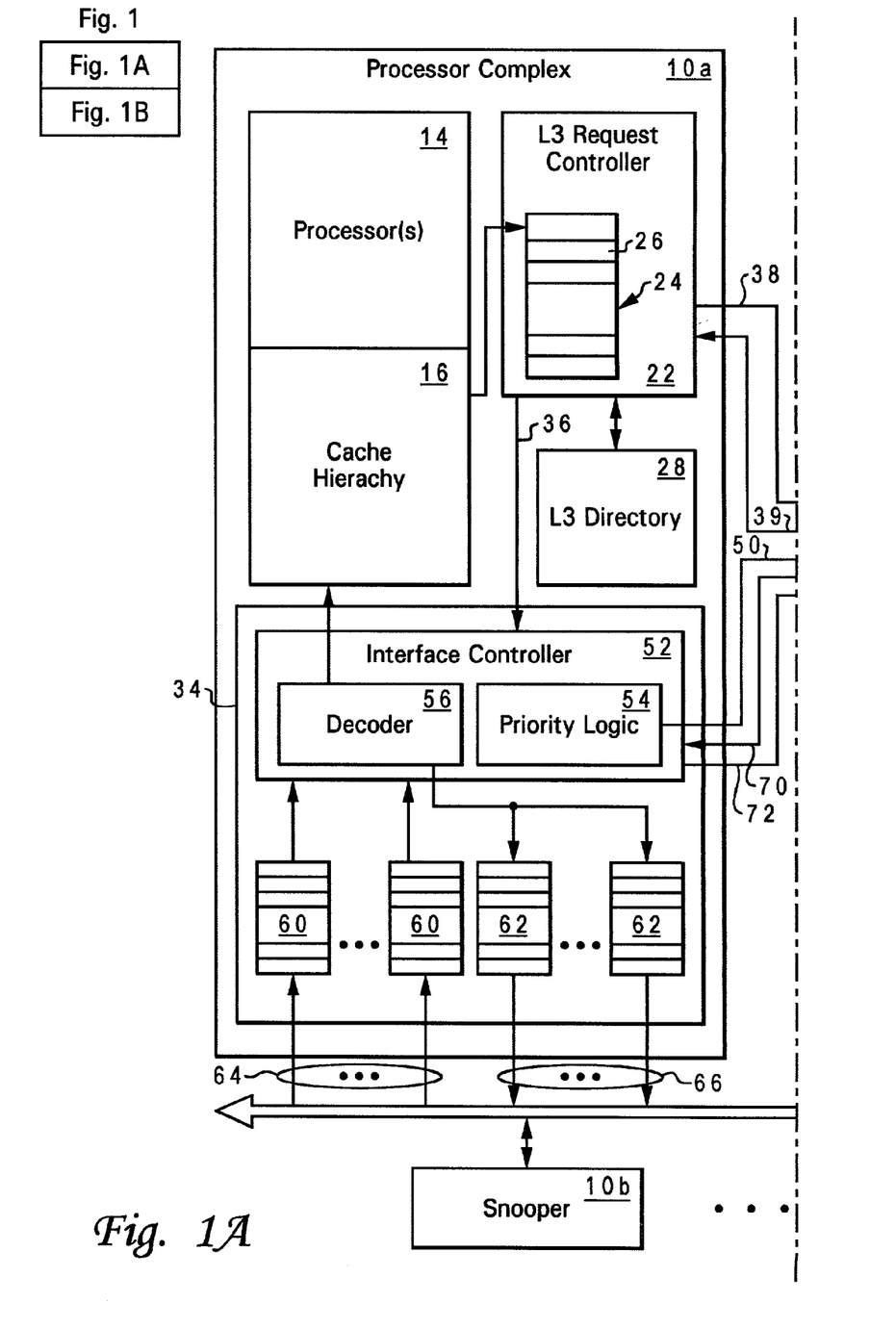
FIG. 1 depicts an illustrative embodiment of a data processing system in accordance with a preferred embodiment of the present invention.
Figure 1B:
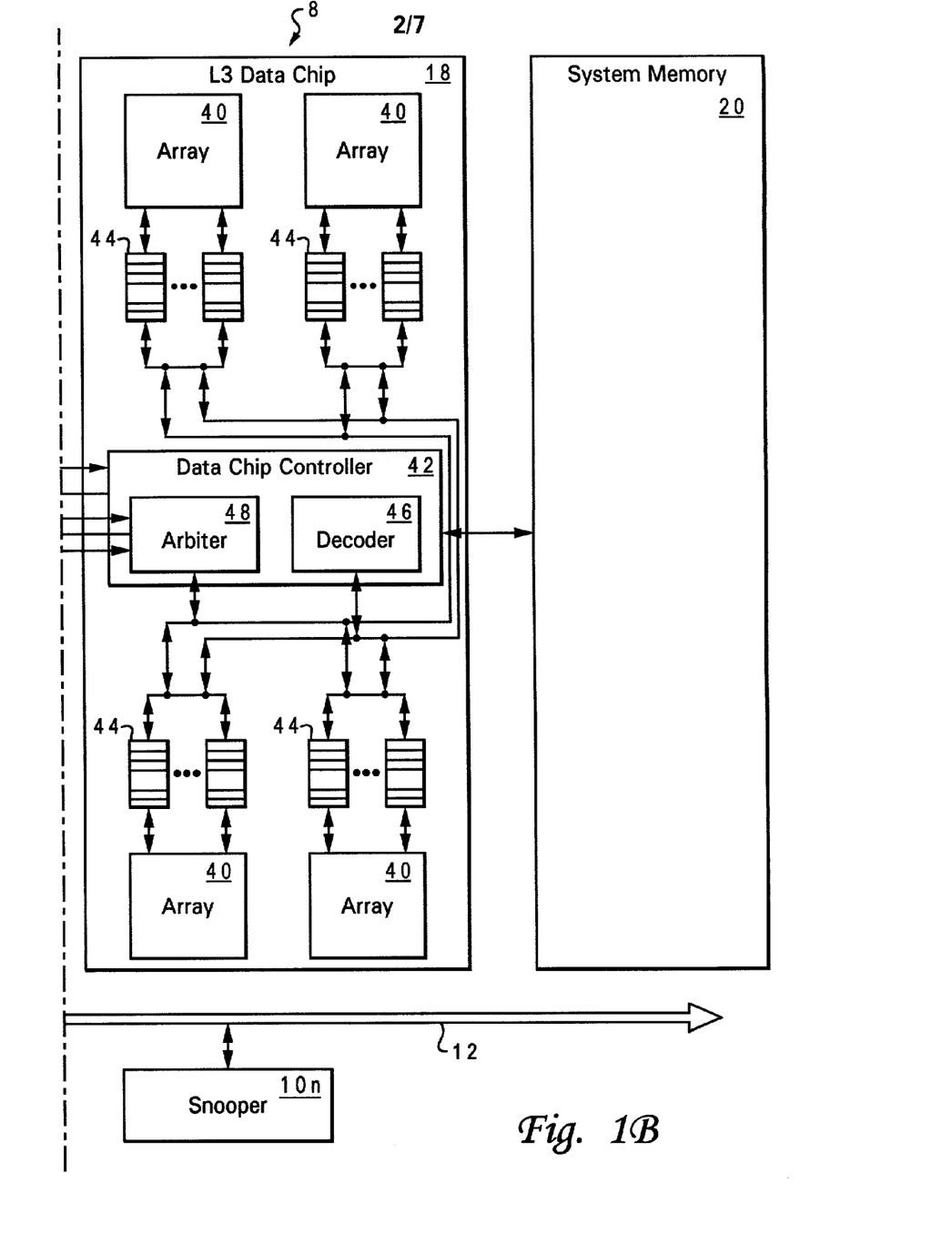

With reference now to the figures and in particular with reference to FIG. 1, there is illustrated a high-level block diagram of an exemplary data processing system that employs a request-and-forget protocol in accordance with the present invention. As depicted, data processing system 8 includes at least one and possibly multiple snoopers 10a–10n coupled to an interconnect fabric 12. Interconnect fabric 12, which can comprise one or more buses but preferably comprises an integrated switch, serves as a conduit for communication between the snoopers 10 coupled to interconnect fabric 12. A typical transaction on interconnect fabric 12 begins with a request, which may include a transaction type, source and destination tags indicating the source and intended recipient(s) of the transaction, respectively, and an address and/or data. Snoopers 10 snoop requests on interconnect fabric 12 and, if appropriate, respond to the request with a snoop response. The various snoop responses are utilized to determine what action, if any, snoopers 10 are to take to service the request. Servicing the request may entail sourcing data to the requester on interconnect fabric 12, storing data provided by the requester, etc.

In the illustrated embodiment, snooper 10a comprises an integrated circuit processor complex including one or more processors 14. Processor(s) 14 have an associated on-chip cache hierarchy 16, which includes, for example, one level-one (L1) and one level-two (L2) cache for each processor 14. Processor(s) 14 also have one or more associated lower levels of off-chip cache memory, such as that provided by L3 data chip 18, and, at the lowest level of the memory hierarchy, a system memory 20. As understood by those skilled in the art, each succeeding lower level of the memory hierarchy is typically capable of storing a larger amount of data than higher levels, but at higher access latency.

Processor complex 10a interfaces with L3 data chip 18 via an on-chip L3 request controller 22, which includes a request queue 24 containing a plurality of queue entries 26. Similar to the interconnect requests discussed above, the requests buffered within request queue 24 may include, for example, a source tag identifying the source of the request, a request address, a transaction type specifying the desired operation on the data identified by the request address, and optionally data. Based upon the request address, L3 request controller 22 determines whether queued requests can be satisfied by either L3 data chip 18 or system memory 20. For example, L3 request controller 22 may determine whether system memory 20 can service a queued request by comparing the request address to a memory map specifying the address ranges assigned to system memory 20 and can determine whether L3 data chip can service a request by reference to an on-chip L3 directory 28 that records addresses associated with the data stored in the arrays 40 of L3 data chip 18. If L3 request controller 22 determines that a request cannot be serviced by L3 data chip 18 or system memory 20, L3 request controller 22 may drop the request or, alternatively, pass the request to an interface unit 34 of processor complex 10a via request line 36 for subsequent transmission to another snooper 10 via interconnect fabric 12. If, however, L3 request controller 22 determines that a request can be serviced by L3 data chip 18 or system memory 20, L3 request controller 22 transmits the request to L3 data chip 18. L3 request controller 22 preferably appends or sets a bypass field for requests destined for system memory 20 to indicate to L3 data chip 18 that such requests should be passed to system memory 20 for processing.

The interface between L3 request controller 22 and L3 data chip 18 includes request lines 38 for communicating requests to L3 data chip 18 and status line(s) 39 by which L3 data chip 18 informs L3 request controller 22 that L3 data chip 18 cannot currently accept additional requests. Thus, in contrast to prior art controller interfaces, which typically generate explicit row, column and address strobes to control the operation of a memory slave, the interface between L3 request controller 22 and L3 data chip 18 provides a high degree of device independence in that L3 request controller 22 is not restricted to use with data chips having any particular internal configuration.

Figure 3:
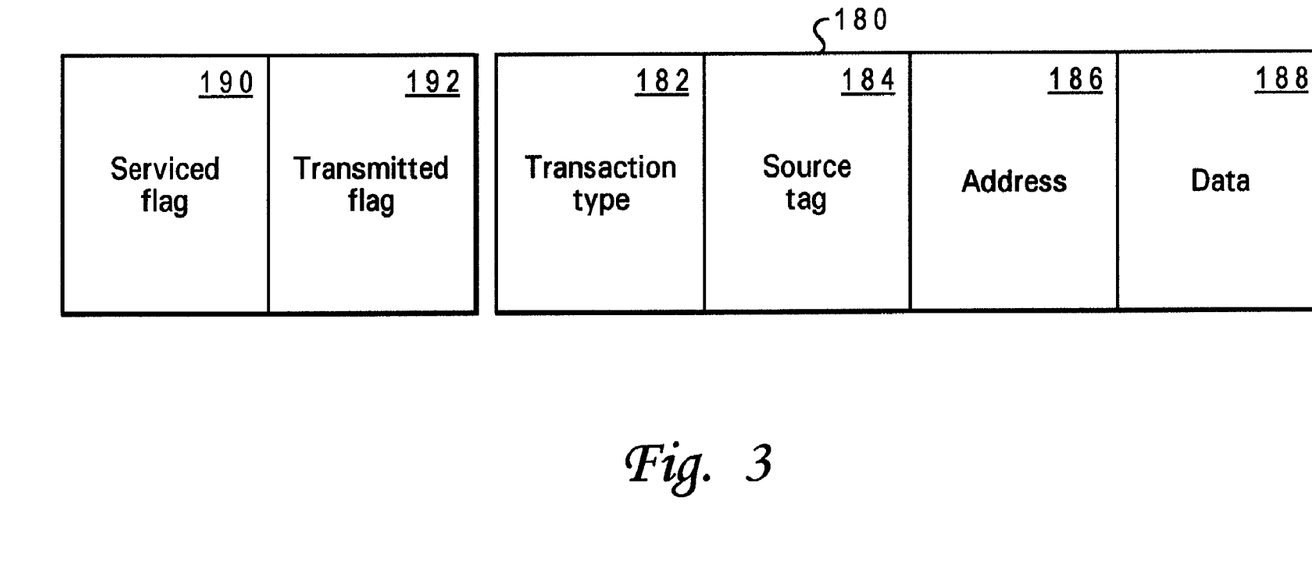
FIG. 3 depicts a queue entry having associated serviced and transmitted flags in accordance with a preferred embodiment of the present invention.

The depicted embodiment of L3 data chip 18 contains a data chip controller 42 and a plurality of arrays 40 for caching data. Each array 40 has an associated set of array queues 44 from which requests are serviced by the associated array 40. As shown in FIG. 3, each array queue entry 180 may include a transaction type field 182, a source tag field 184, an address field 186, and a data field 188. Each array queue entry 180 also preferably has an associated serviced flag 190 to indicate to data chip controller 42 when the request contained therein has been serviced, and may optionally have additional associated flags, as discussed further below.

As illustrated, data chip controller 42 includes a decoder 46 that passes requests having a set bypass field to system memory 20 and that assigns the remaining requests to the appropriate array queues 44 for servicing. In a preferred embodiment in which each set of array queues 44 contains a respective array queue 44 (or a respective allocation of queue entries from a shared pool of queue entries) for each type of request, decoder 46 selects an array 40 to service a request based upon the request address and assigns requests to an array queue 44 associated with the selected array 40 based upon the transaction type. Array circuitry (not illustrated) associated with arrays 40 service requests enqueued in their respective set of array queues 44 and, if the request is a Read or other request for data, store the requested data in the array queue entry in conjunction with the request. The serviced request (or response) may thus include the same fields as a request, and optionally one or more additional fields. The serviced flag 190 is set to indicate when a request has been serviced.

As shown, data chip controller 42 also includes an arbiter 48 that governs which serviced requests are retired from array queues 44. Although arbiter 48 can prioritize serviced requests to be retired based upon any one or combination of selection methods, including static selection methods (e.g., random or round robin) or dynamic selection methods (e.g., based upon the number of total requests or serviced requests in each of array queues 44), arbiter 48 preferably additionally prioritizes which serviced requests are retired based upon an imprecise priority signal 50, which processor complex 10a utilizes to specify one or more favored transaction types for which responses are desired. Priority signal 50 is said to be imprecise in that arbiter 48 can select a different type of transaction(s) than that specified by priority signal 50 without causing improper system operation.

Referring again to processor complex 10a, interface unit 34 comprises an interface controller 52, a pool of inbound queues 60 for temporarily buffering inbound requests and responses received from interconnect fabric 12, a pool of outbound queues 62 for temporarily buffering outbound requests and responses for transmission on interconnect fabric 12, and a plurality of input and output ports 64 and 66 by which requests and responses are communicated with interconnect fabric 12. Interface controller 52 preferably dynamically sets and adjusts the number of entries in inbound and outbound queues 60 and 62 that may be allocated to requests and responses of each transaction type. Interface controller 52 indicates to arbiter 48 when no more requests of a given type can be received via status lines 72.

As shown, interface controller 52 includes priority logic 54, which generates priority signal 50 based upon inputs such as the number of entries within inbound queues 60 and outbound queues 62 allocated to each type of transaction, the queue size allocated to each transaction type, a system monitor input, etc. Interface controller 52 further includes a decoder 56 that receives request responses (i.e., serviced requests) from arbiter 48 via response lines 70 and, based upon the transaction type and source specified by the responses, forwards the request responses to either cache hierarchy 16 or one of outbound queues 62. For example, decoder 56 passes responses to Read requests specifying cache hierarchy 16 as a source to cache hierarchy 16, but forwards responses for Read requests specifying another snooper 10 as the source to one of outbound queues 62.

Those skilled in the art will appreciate that data processing system 8 can include many additional unillustrated components, such as interconnect bridges, non-volatile storage, ports for connection to networks or attached devices, etc. Because such additional components are not necessary for an understanding of the present invention, they are not illustrated in FIG. 1 or discussed further herein. It should also be understood, however, that the enhancements provided by the present invention are generally applicable to communication within and between data processing systems of any architecture and is in no way limited to the generalized data processing system architecture illustrated in FIG. 1.

With reference now to FIGS. 2A–2D, there are depicted a series of high-level logical flowcharts that together illustrate an exemplary implementation of a request-and-forget protocol for communicating requests and responses between a requester, a recipient and a response receiver in accordance with the present invention. The flowcharts will be described with reference to data processing system 8 of FIG. 1, in which L3 request controller 22, data chip controller 42 and interface controller 52 serve as the requester, recipient and response receiver, respectively. As will be appreciated from the following description, FIGS. 2A–2D illustrate logical sequences of steps, which may be performed concurrently or, in some cases, in an alternative order.

Figure 2A:
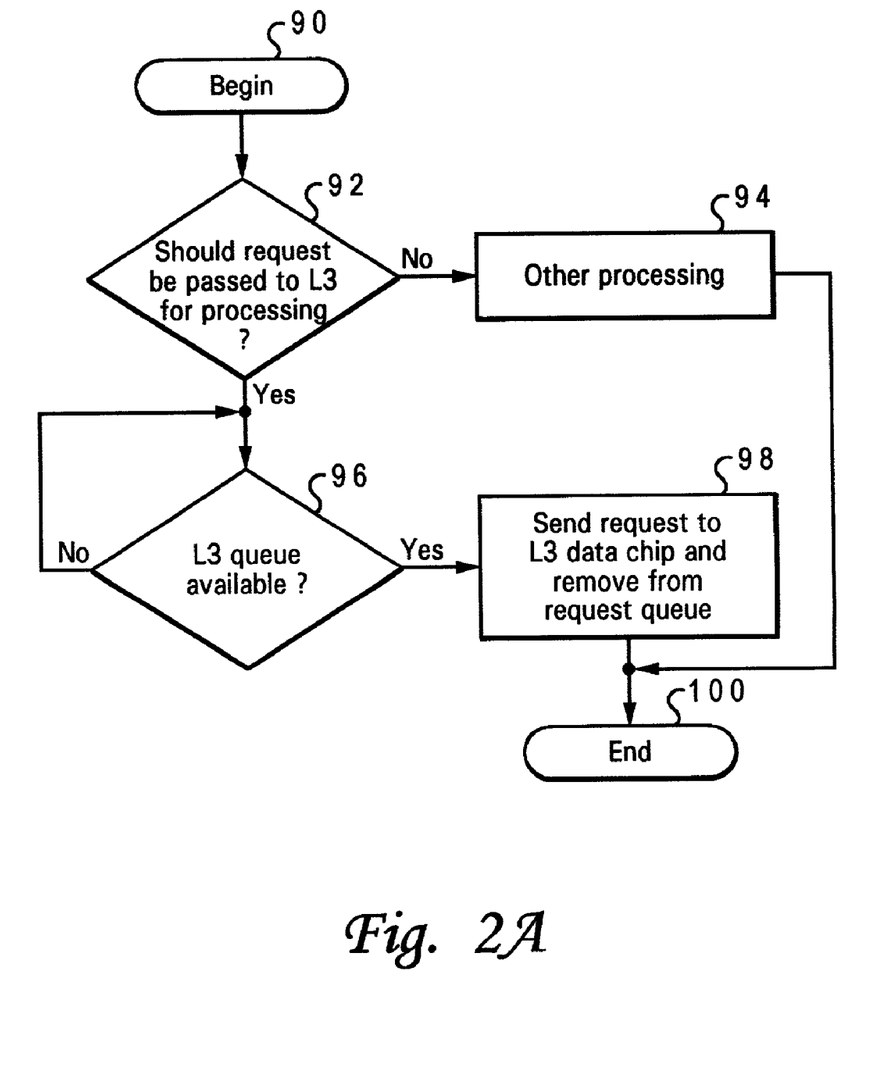
FIG. 2A is a high-level logical flowchart of the operation of a requestor (which in the data processing system embodiment shown in FIG. 1 is L3 request controller 22) that employs a request-and-forget protocol in accordance with the present invention.

Referring first to FIG. 2A, there is illustrated a high-level logical flowchart of the operation of a requester (which in the data processing system embodiment shown in FIG. 1 is L3 request controller 22) that employs a request-and-forget protocol in accordance with the present invention. As shown, the process begins at block 90 and then proceeds to block 92, at which point L3 request controller 22 begins processing on a request queued in an entry 26 of request queue 24. Block 92 depicts L3 request controller 22 determining whether or not the request should be passed to L3 data chip 18 for processing. As discussed above, the determination illustrated at block 92 can be made by reference to a memory map, which specifies the addresses assigned to system memory 20, and to L3 directory 28, which specifies which data are cached in arrays 40 of L3 data chip 18. If L3 request controller 22 determines at block 92 that the request should not be passed to L3 data chip 18 for processing, then the process illustrated in FIG. 2A passes to block 94, which illustrates L3 request controller 22 dequeuing the request for processing and, for example, transmitting the request to interface controller 52 via request line 36. The process then terminates at block 100.

Returning to block 92, in addition to a determination that the queued request should be passed to L3 data chip 18 for processing, a determination is made at block 96 whether data chip controller 42 has signaled via status line(s) 39 that queue entries are available to receive requests. If L3 request controller 22 determines that the queued request should be passed to L3 data chip 18 for processing and that no queue entry for the request is currently available, then L3 request controller 22 waits until data chip controller 42 indicates via status line(s) 39 that a queue entry has become available, as shown by the process iterating at block 96. When a queue entry is available, L3 request controller 22 transmits the request to data chip controller 42 of L3 data chip 18 via request lines 38 and dequeues the request from request queue 24. Thus, in contrast to prior art request protocols, which retain a request in a queue entry until the request is serviced, the request-and-forget protocol of the present invention dequeues the request upon successful transmission, freeing the associated queue entry to be allocated to a new request. Thereafter, the process illustrated in FIG. 2A terminates at block 100.

Figure 2B:
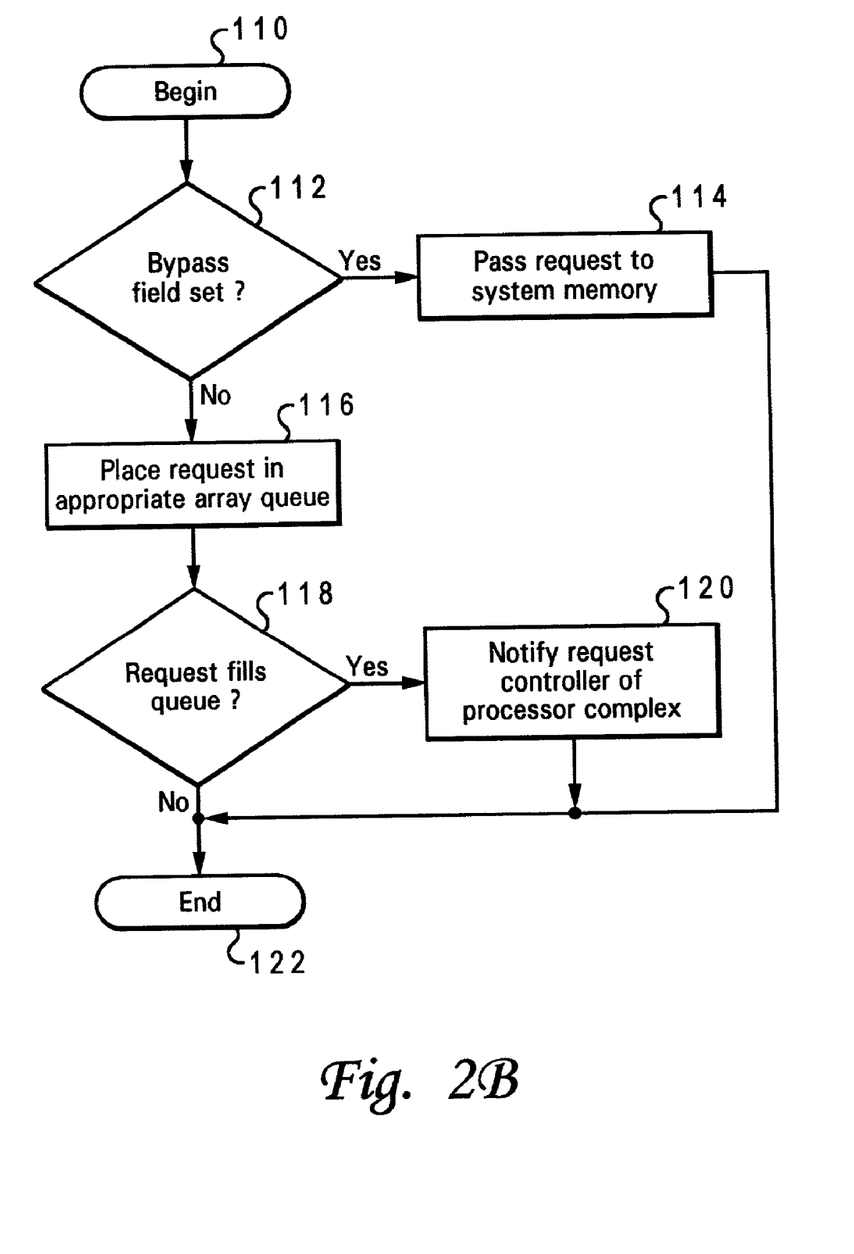
FIG. 2B is a high-level logical flowchart of the operation of a recipient (which in the data processing system embodiment shown in FIG. 1 is L3 data chip 18) that employs a request-and-forget protocol in accordance with the present invention.

With reference now to FIG. 2B, there is depicted a high-level logical flowchart of the operation of a recipient (which in the data processing system embodiment shown in FIG. 1 is data chip controller 42 of L3 data chip 18) that employs a request-and-forget protocol in accordance with the present invention. As illustrated, the process begins at block 110 in response to receipt of a request from L3 request controller 22 via request lines 38. The process then proceeds to block 112, which illustrates data chip controller 42 determining whether or not the bypass field is set in the request to indicate that the request is intended for system memory 20. In response to a determination that the bypass field is set in the request, the process proceeds to block 114, which illustrates data chip controller 42 passing the request to system memory 20 for servicing. The process thereafter terminates at block 122.

Referring again to block 112, in response to a determination that the bypass field is not set in the request, the process proceeds to block 116, which depicts decoder 46 of data chip controller 42 decoding the request's address and transaction type and enqueuing the request in the relevant array queue 44 of the appropriate array 40. Data chip controller 42 next determines at block 118 whether or not enqueuing the request filled the array queue 44 such that additional requests of the same type cannot now be received. If not, the process terminates at block 122. However, if enqueuing the request fills an array queue 44, the process passes to block 120, which illustrates data chip controller 42 indicating to L3 request controller 22 via status lines 39 that additional requests of the same type as the last request cannot now be received. As will be appreciated by those skilled in the art, additional and more specific information such as the array 40 having the full array queue 44 can be provided to reduce unnecessary stalls. Following block 120, the process illustrated in FIG. 2B terminates at block 122.

Figure 2C:
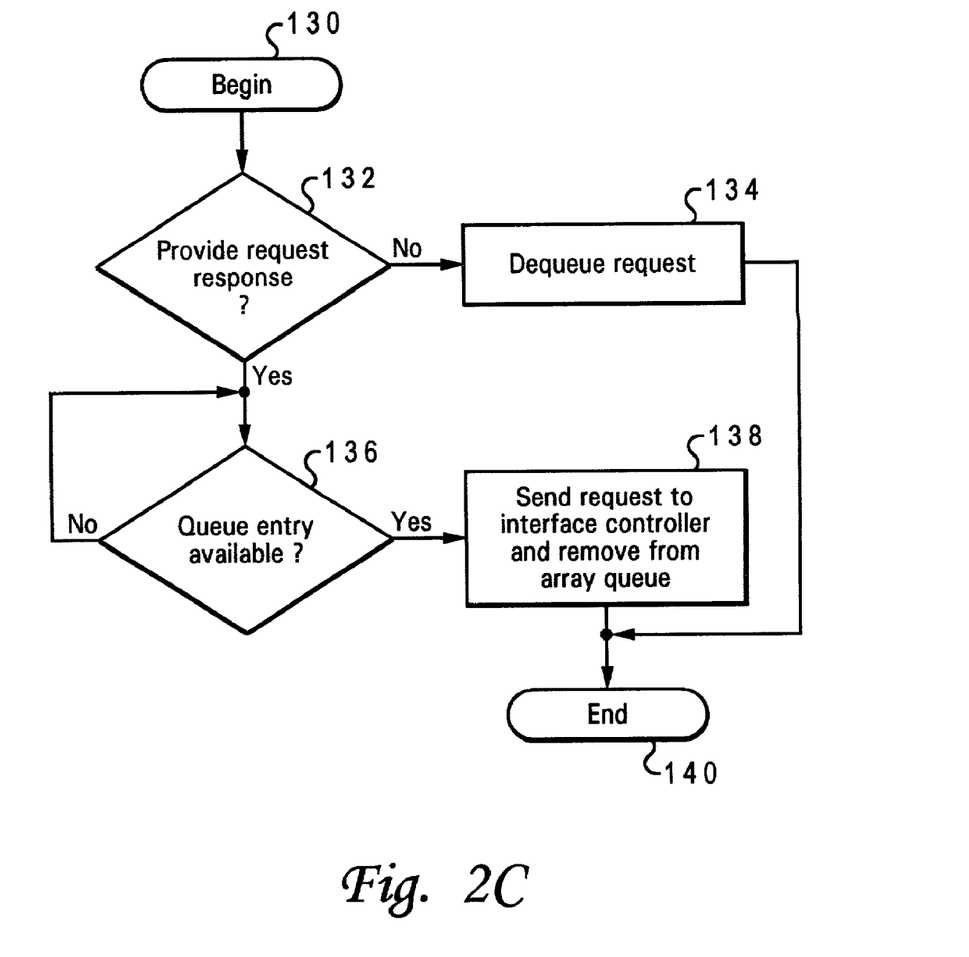
FIG. 2C is a high-level logical flowchart of a method of communicating request responses from a recipient to a response receiver in accordance with the request-and-forget protocol of the present invention.

Referring now to FIG. 2C, there is illustrated a high-level logical flowchart of a process employed by the recipient (which in the data processing system embodiment shown in FIG. 1 is data chip controller 42) to communicate serviced requests to the response recipient (e.g., interface controller 52) in accordance with the request-and-forget protocol of the present invention. It can be seen by comparison of FIG. 2C with FIG. 2A that the process is nearly identical to that employed by L3 request controller 22 to communicate requests to data chip controller 42.

As illustrated, the process begins at block 130 and then proceeds to block 132, at which point processing begins on a serviced request queued in an entry of an array queue 44. As noted above, serviced requests are preferably identified by the setting of the serviced flag 190 associated with the queue entries. As also mentioned above, data chip controller 42 can select the serviced request for processing based upon one or multiple inputs, including the imprecise priority signal 50 provided by priority logic 54.

As shown at blocks 132 and 134, if the request is the type that does not require a response (e.g., a Write or Kill), data chip controller 42 simply dequeues the request, freeing the queue entry for allocation to another request. However, if the request requires a response, the process passes to block 136, which represents a determination of whether interface controller 52 has signaled via status line(s) 72 that a queue entry is not available to receive responses of the type under consideration. If so, then data chip controller 42 waits to transmit the response until interface controller 52 indicates via status line(s) 72 that a queue entry has become available, as shown by the process iterating at block 136. (During this waiting period, data chip controller 42 can transmit responses of different types to interface controller 52.) When a queue entry is available to receive the response, data chip controller 42 transmits the response to interface controller 52 via response lines 70 and dequeues the request from request queue 24. Thereafter, the process illustrated in FIG. 2C terminates at block 140.

Figure 2D:
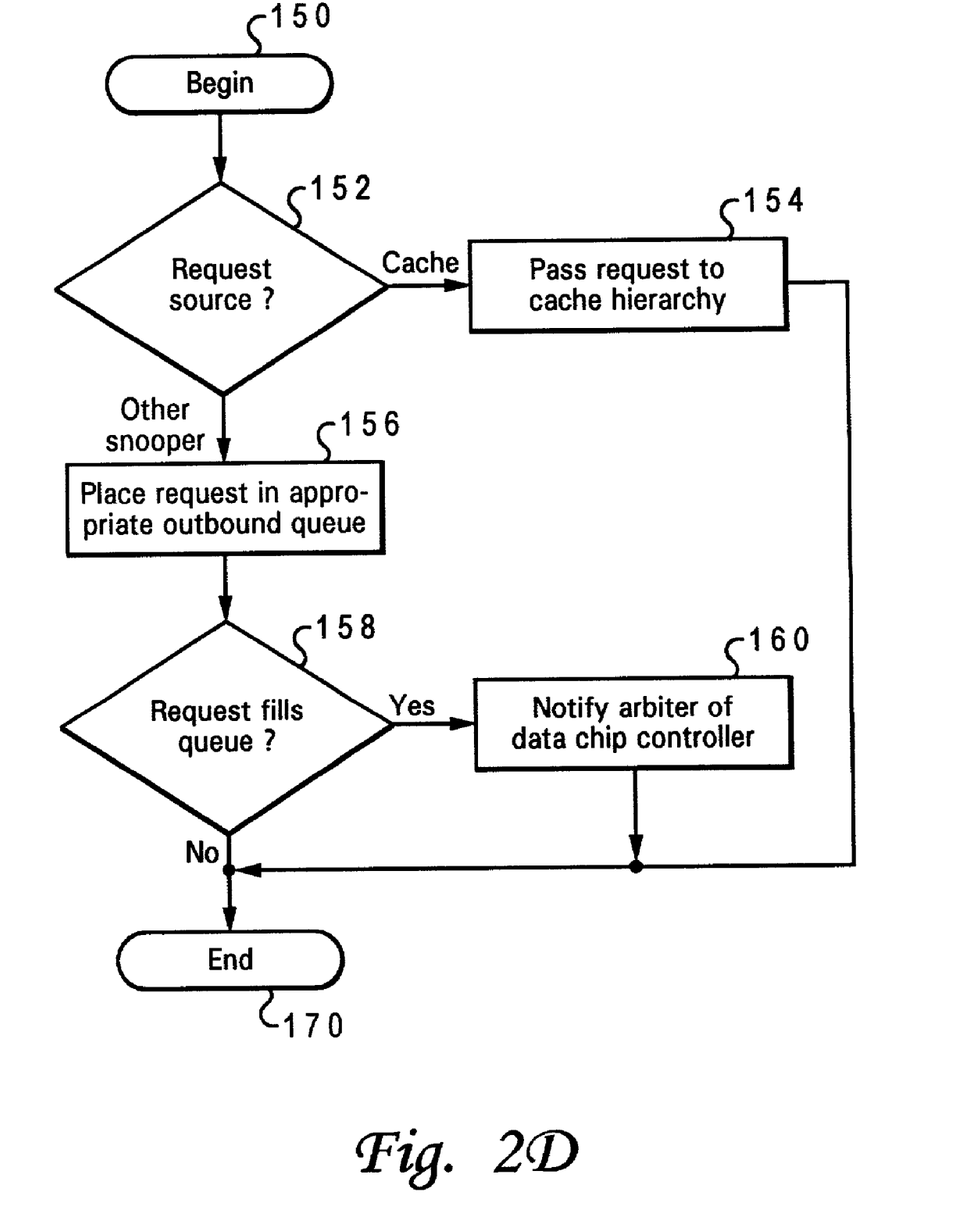
FIG. 2D is a high-level logical flowchart of the operation of a response receiver (which in the data processing system embodiment of FIG. 1 is interface controller 52) that employs a request-and-forget protocol in accordance with the present invention.

With reference now to FIG. 2D, there is depicted a high-level logical flowchart of the operation of a response receiver (which in the data processing system embodiment shown in FIG. 1 is interface controller 52) that employs a request-and-forget protocol in accordance with the present invention. As can be seen by comparison of FIG. 2D with FIG. 2B, the process illustrated in FIG. 2D is very similar to that performed by data chip controller 42 when receiving requests from L3 request controller 22.

As illustrated in FIG. 2D, the process begins at block 150 in response to receipt of a response from data chip controller 42 via response lines 70. The process then proceeds to block 152, which illustrates decoder 56 determining whether the source of the request was cache hierarchy 16 or one of snoopers 10b–10n. In response to a determination that the source of the request was cache hierarchy 16, the process proceeds to block 154, which illustrates interface controller 52 passing the response to cache hierarchy 16 for processing (e.g., caching requested data). The process thereafter terminates at block 170.

Referring again to block 152, in response to a determination that the source of the request was one of snoopers 10b–10n, the process proceeds to block 156, which depicts decoder 56 of interface controller 52 decoding the transaction type and enqueuing the response in an entry of the appropriate outbound queue 62 for subsequent transmission to the request source via interconnect fabric 12. Interface controller 52 next determines at block 158 whether or not enqueuing the request filled all entries in outbound queues 62 that can be allocated to responses of the same type. If not, the process terminates at block 170. However, if enqueuing the request fills all outbound queue entries that can be allocated to responses of this type (and if interface controller 52 does not dynamically allocate more queue entries in the pool of outbound queues 62 to this response type), the process passes to block 160, which illustrates interface controller 52 indicating to arbiter 48 via status lines 72 that additional responses of the same type as the last request cannot now be received. Following block 160, the process illustrated in FIG. 2D terminates at block 170.

An implementation detail not addressed in the high-level flowcharts described above concerns how the request-and-forget protocol of the present invention can be employed in data processing system embodiments in which the latency between the transmission of requests to the recipient or to the response receiver is less than the latency of the status lines. For example, if a request or response can be transmitted every other clock cycle and status indications have a latency of 10 clock cycles, it is apparent that, following transmission of a status signal, up to five requests or responses may be lost if they are dequeued upon transmission.

Several mechanisms can be employed to avert this type of data loss, including limiting the rate at which requests and responses can be transmitted or adding an explicit request acknowledgment/retry mechanism to the requester, recipient, and response receiver interfaces to inform the device transmitting the request or response whether a particular request or response was successfully received. It is, however, presently preferable to maintain maximum request and response rates and to avoid introducing complexity into the device interfaces. This can be accomplished while preventing data loss by utilizing a timer to delay dequeuing transmitted requests and responses from request queue 24 and array queues 44 for an interval following transmission of the request or response equal in duration to the worst-case latency of the status indication. In this manner, if L3 request controller 22 or data chip controller 42 receives a status signal, all transmitted but not yet dequeued requests or responses affected by the status indication can simply be retransmitted when the status indication is removed. As shown in FIG. 3, transmitted requests or responses can be identified by setting a transmitted flag 192 associated with the queue entries buffering such requests or responses.

As has been described, the present invention introduces a request-and-forget protocol for communicating data (such as requests and responses) in a data processing system. In accordance with the request-and-forget protocol of the present invention, a queued request (or response) is transmitted to a recipient and, in contrast to traditional interfaces (e.g., bused interfaces) that maintain the request in the queue entry until the request is serviced, the request is removed from the queue prior to servicing.

The request-and-forget protocol of the present invention has a number of attendant benefits. First, the number of requests or responses that can be "in flight" at any one time is not limited by the queue depth of the device transmitting the requests or responses. Thus, queue depths and circuit area may be reduced without diminishing performance. Second, queue depths and queue entries allocations of various devices are made independent. Consequently, the allocation of queue entries to various types of requests and responses can be dynamically altered during operation of the data processing system without the need to explicitly inform any other component. Third, the request-and-forget protocol permits a wide range of flexibility in system design because a wide range of components can be utilized in the data processing system without any special configuration as long as the generic request interface is supported.

While the invention has been particularly shown and described with reference to a preferred embodiment, it will be understood by those skilled in the art that various changes in form and detail may be made therein without departing from the spirit and scope of the invention. For example, the status lines described above can be omitted if the device sending requests or responses knows or is provided with knowledge of the queue depths of the device receiving the requests or responses. More generally, although the described data processing system embodiment employs the request-and-forget protocol of the present invention for communication between integrated circuits, it should be understood that the request-and-forget protocol is not limited merely to chip-to-chip communication. Rather, the request-and-forget protocol of the present invention can be employed, without limitation, in communication over the system interconnect (e.g., interconnect fabric 12), communication between integrated circuits within a chip module, and communication between subcircuits of a single integrated circuit.

What is claimed is:

1. A method of communication in a data processing system, said method comprising:
    at a requestor, buffering a request in an entry of a request queue;
    the requestor transmitting the request to a recipient for servicing;
    transmitting a status signal from the recipient to the requestor to signal the requestor to refrain from transmitting requests to the recipient; and the requestor removing the request from the entry of the request queue without receipt of any indication that the request has been serviced, wherein removing the request comprises:
if said status signal is not received during an interval of at least a latency of said status signal, removing the transmitted request from the entry of the request queue after expiration of said interval.

2. The method of claim 1, and further comprising:
in response to receipt of said status signal during said interval, retaining said request in the entry of the request queue and retransmitting the request from the requestor to said recipient.

3. The method of claim 1, wherein transmitting the request comprises transmitting a plurality of requests including the request for which no request response has been received, wherein said plurality of requests includes a number of requests greater than a number of queue entries for buffering requests at said requestor.

4. The method of claim 1, and further comprising:
servicing the request and buffering a request response in a queue entry in the recipient; and
transmitting the request response to a response receiver and removing the request response from the queue entry in the recipient.

5. The method of claim 4, and further comprising:
the response receiver outputting an imprecise priority signal indicating at least one preferred type of request response; and
the recipient selecting the request response from among a plurality of request responses for transmission to the response receiver at least partially in response to the priority signal.

6. The method of claim 1, wherein transmitting the request comprises transmitting the request to a memory device.

7. A requester for a data processing system, said requester comprising:
a request queue having at least one entry storing a request; and
a request controller that transmits the request to a recipient for servicing and removes the request from the entry of the request queue without receipt of any indication that the request has been serviced, wherein:
the request controller includes means for receiving a status signal from a recipient that signals the requester to refrain from transmitting requests to the recipient; and
the request controller, if the status signal is not received from the recinient during an interval of at least a latency of said status signal, removes the transmitted request from the entry after expiration of said interval.

8. The requester of claim 7, wherein the request controller retains the request in the entry of the request queue and retransmits the request to the recipient in response to receipt of said status signal during said interval.

9. The requester of claim 7, wherein the request controller transmits a plurality of requests from said request queue for which no request response has been received, and wherein said plurality of requests includes a number of requests greater than a number of queue entries in said request queue.

10. A data processing system, comprising:
a requestor in accordance with claim 7, and said recipient.

11. The data processing system of claim 10, wherein the recipient comprises a memory device.

12. The requestor of claim 11, wherein the requester forms at least a portion of a processor complex.

13. The data processing system of claim 10, wherein:
the recipient receives from a response receiver an imprecise priority signal indicating at least one preferred type of request response; and
the recipient includes an arbiter that selects request responses for transmission to the response receiver at least partially in response to the priority signal.

14. A data processing system comprising:
a recipient:
a requestor, including:
a request queue having at least one entry storing a request;
a request controller that transmits the request to the recipient for servicing and removes the request from the entry of the request queue without receipt of any indication that the request has been serviced; and
a response receiver to which said recipient transmits request responses, wherein:
the response receiver includes priority logic that outputs an imprecise priority signal indicating at least one preferred type of request response; and
the recipient includes an arbiter that selects request responses for transmission to the response receiver at least partially in response to the priority signal.

15. The data processing system of requestor of claim 14, wherein the response receiver includes means for transmitting a status signal to the recipient that signals that the recipient should refrain from transmitting request responses to the response receiver.

16. The data processing system of claim 15, wherein the recipient includes a plurality of queue entries for buffering request responses and a recipient controller, wherein the recipient controller removes a transmitted request response from the plurality of queue entries after an interval of at least a latency of said status signal if said status signal is not received during said interval.

17. The data processing system of claim 16, wherein the recipient controller retransmits the request response in response to receipt of said status signal during said interval.

18. The data processing system of claim 14, wherein:
the recipient generate a status signal to signal to the requestor that the requestor should refrain from transmitting requests to the recipient, wherein said status signal has a latency; and
the request controller, if the stats signal is not received from the recipient during an interval of at least the latency of said status signal, removes the transmitted request from the entry after expiration of said interval.

* * * * *